United States Patent
Fisher et al.

(10) Patent No.: US 10,176,439 B2
(45) Date of Patent: Jan. 8, 2019

(54) MANAGING NETWORKED RESOURCES

(75) Inventors: Bradford Austin Fisher, Chapel Hill, NC (US); Robert Thomas Uthe, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1574 days.

(21) Appl. No.: 11/034,338

(22) Filed: Jan. 11, 2005

(65) Prior Publication Data
US 2006/0155564 A1    Jul. 13, 2006

(51) Int. Cl.
*G06Q 10/06* (2012.01)

(52) U.S. Cl.
CPC ........... *G06Q 10/063* (2013.01); *G06Q 10/06* (2013.01)

(58) Field of Classification Search
USPC .......................................................... 705/1
See application file for complete search history.

(56) References Cited

U.S. PATENT DOCUMENTS

| | | | |
|---|---|---|---|
| 6,442,631 B1 * | 8/2002 | Neufeld et al. | 710/107 |
| 6,526,387 B1 | 2/2003 | Ruffin et al. | 705/7 |
| 6,944,777 B1 * | 9/2005 | Belani et al. | 713/150 |
| 7,308,511 B2 * | 12/2007 | Wilson et al. | 710/8 |
| 7,523,092 B2 * | 4/2009 | Andreev et al. | 707/2 |
| 2001/0033646 A1 * | 10/2001 | Porter et al. | 379/243 |
| 2002/0087734 A1 | 7/2002 | Marshall et al. | 709/310 |
| 2002/0105550 A1 * | 8/2002 | Biebesheimer et al. | 345/835 |
| 2003/0009507 A1 | 1/2003 | Shum | 709/104 |
| 2003/0088456 A1 | 5/2003 | Ernest et al. | 705/10 |
| 2003/0093310 A1 | 5/2003 | Macrae | 705/8 |
| 2004/0003353 A1 * | 1/2004 | Rivera et al. | 715/530 |
| 2004/0024627 A1 | 2/2004 | Keener | 705/7 |
| 2004/0059611 A1 | 3/2004 | Kananghinis et al. | 705/7 |
| 2004/0143470 A1 | 7/2004 | Myrick et al. | 705/7 |
| 2004/0177244 A1 | 9/2004 | Murphy et al. | 713/100 |
| 2004/0186905 A1 * | 9/2004 | Young et al. | 709/225 |
| 2004/0218602 A1 * | 11/2004 | Hrastar | 370/390 |
| 2004/0221290 A1 * | 11/2004 | Casey et al. | 718/104 |
| 2005/0033846 A1 * | 2/2005 | Sankaranarayan et al. | 709/226 |

* cited by examiner

*Primary Examiner* — Andrew B Whitaker
(74) *Attorney, Agent, or Firm* — Grasso PLLC

(57) ABSTRACT

A method of automatically and intelligently maintaining business systems, including information technology assets. A management system automatically maintains a business system based on relationships among resources within the business system and/or on a priority rank that establishes the value or importance of a particular resource. The management system, and optionally the user, can also create rules for maintaining relationships among resources and for maintaining relationships among different business systems. The management system automatically adapts to a change in rules by maintaining relationships among resources and business systems based on a change in the rules.

24 Claims, 7 Drawing Sheets

MANAGING NETWORKED RESOURCES

BACKGROUND OF THE INVENTION

1. Technical Field

The present invention is related generally to a data processing system and in particular to a method and apparatus for processing data. Still more particularly, the present invention relates to a method, apparatus, and computer instructions for automatically maintaining business systems.

2. Description of Related Art

Businesses are searching for solutions to information technology problems in the context of overall business performance. It is often necessary, but not sufficient, that the businesses' computer hardware and software operate correctly and efficiently. In addition, decisions regarding managing the information technology resources of a business should take into account the overall performance of an enterprise or an entire company and not just the performance of the hardware or software.

Current systems management applications provide the ability to link information technology resources to aspects of a business, creating collections of information technology resources commonly known as business systems. An important part of managing such resources, and of the business itself, is determining which business systems are affected by a state change in the information technology resources and the impact that a given state change has on the business. Managing information technology resources associated with business systems is an intense manual process, especially when the resources of a business frequently change. Managing business systems manually therefore requires skilled labor and a high overhead expense. Accordingly, it would be advantageous to create a system for automatically and intelligently maintaining business systems in order to eliminate the need for manually maintaining these systems.

BRIEF SUMMARY OF THE INVENTION

The present invention provides for a method of automatically and intelligently maintaining business systems, including information technology assets. A management system automatically maintains a business system based on relationships among resources within the business system and/ or on a priority rank that establishes the value or importance of a particular resource. The management system, and optionally the user, can also create rules for maintaining relationships among resources and for maintaining relationships among different business systems. The management system automatically adapts to a change in rules by maintaining relationships among resources based on a change in the rules.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
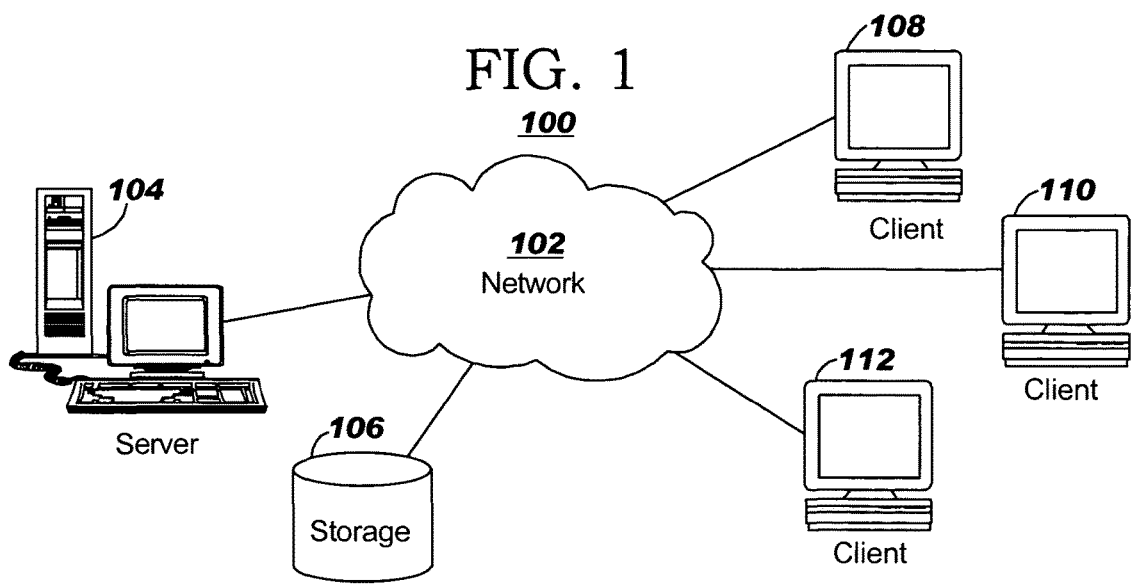
FIG. 1 is a pictorial representation of a network of data processing systems, in which the present invention may be implemented.

FIG. 1 is a pictorial representation of a network of data processing systems, in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, running system images, and programs to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
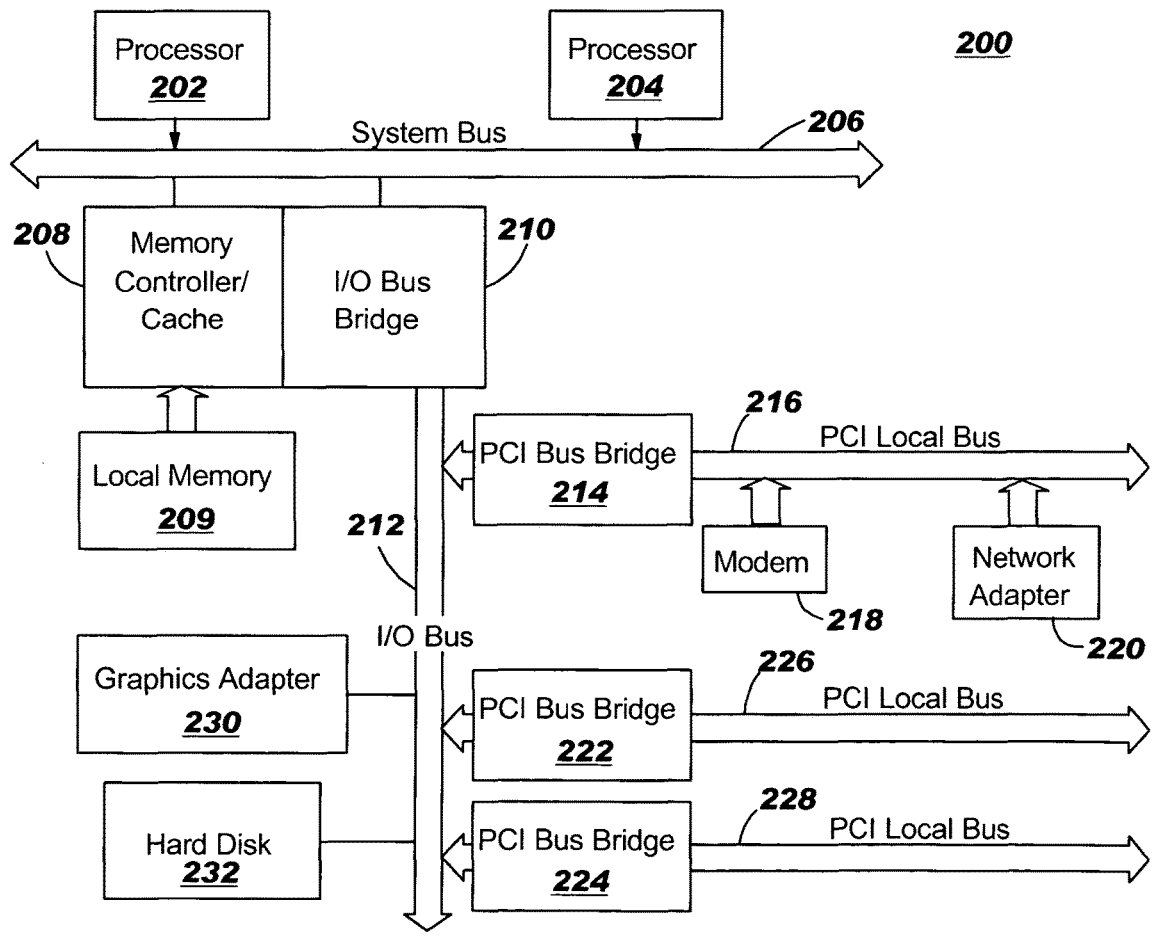
FIG. 2 is a block diagram of a data processing system that may be implemented as a server in which the present invention may be implemented.

FIG. 2 is a block diagram of a data processing system that may be implemented as a server, such as server 104 in FIG. 1, in which the present invention may be implemented. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) running system or LINUX running system.

Figure 3:
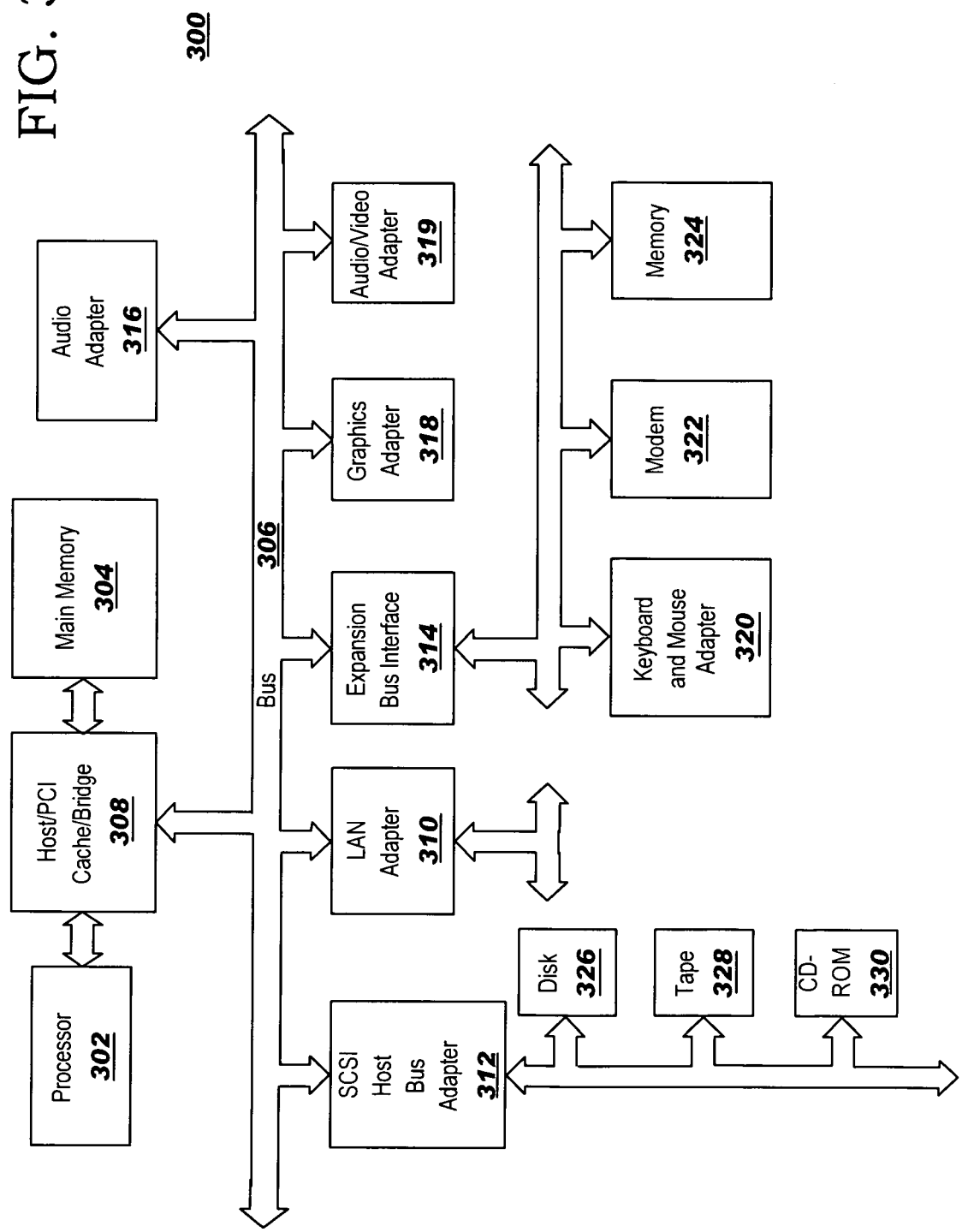
FIG. 3 is a block diagram illustrating a data processing system in which the present invention may be implemented.

FIG. 3 is a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The running system may be a commercially available running system, such as Windows XP, which is available from Microsoft Corporation. An object oriented programming system such as Java may run in conjunction with the running system and provide calls to the running system from Java programs or programs executing on data processing system 300. "Java" is a trademark of Sun Microsystems, Inc. Instructions for the running system, the object-oriented programming system, and programs or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing running system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides for automatically and intelligently maintaining business systems, including information technology assets. A management system automatically maintains business systems based on resource relationships, including dependencies, and a priority rank that establishes the value or importance of a particular resource. The management system also uses one or more databases, containing information regarding each resource, to automatically maintain business systems. The management system, and optionally the user, can also create rules for maintaining relationships among resources and among business systems. The management system automatically adapts to a change in rules by maintaining relationships among resources and business systems based on a change in the rules. Maintaining business systems includes creating, deleting, amending, or otherwise maintaining resources.

Figure 4A:
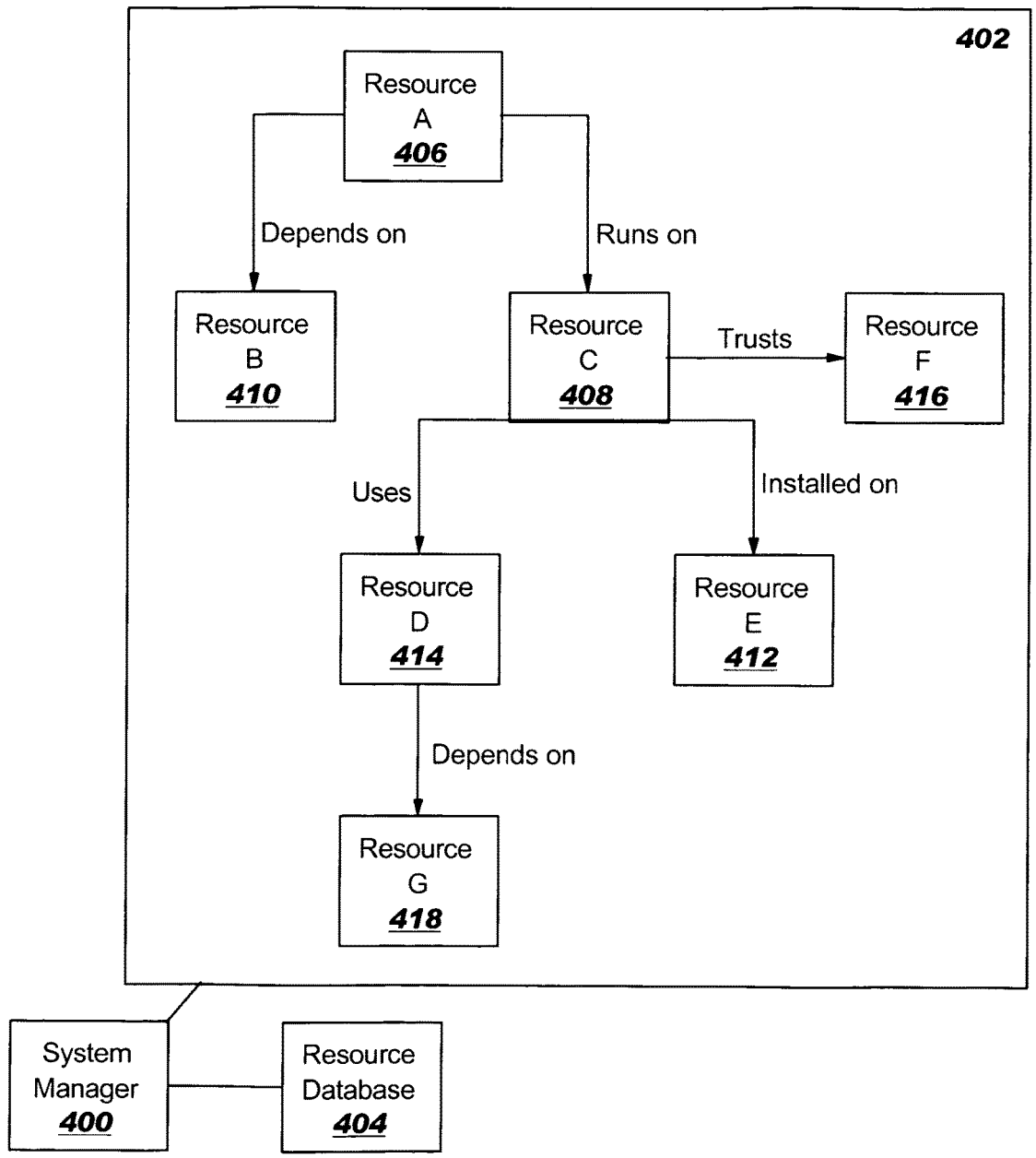
FIG. 4A is a block diagram illustrating a set of resource dependencies for a business system, in accordance with a preferred embodiment of the present invention.

FIG. 4A is a block diagram illustrating a set of resource dependencies for a business system, in accordance with a preferred embodiment of the present invention. In the illustrative embodiment, system manager 400 manages business system 402. The system manager is one or more data processing systems and/or one or more software applications adapted to manage business system 402. Business system 402 is a collection of business resources, which simply may be referred to as resources. Each resource and the relationships among all resources in the business system may be represented in a database.

System manager 400 may be operably connected to a resource database 404. Resource database 404 contains information regarding one or more resources within business system 402 and allows system manager 400 to operate more efficiently. Resource database 404 may be created by system manager 400. In this case, system manager 400 automatically identifies all resources within business system 402, retrieves information regarding each found resource, and stores the retrieved information in resource database 404. A user may also provide resource database 404 with information regarding which resources exist within a business system.

Each resource may be an information technology resource or represent a non-information technology resource. For example, an information technology resource may be a server, such as server 104 of FIG. 1, a client, such as clients 108, 110, and 112, a storage device, such as storage device 106, a network, such as network 102, the systems shown in FIG. 2 and FIG. 3, a router, an application or software, a database representing the capabilities of an information technology asset, or any other information technology asset or resource. A non-information technology resource may be represented by a database characterizing the non-information technology resource. In this case, the database may represent information such as how many transactions are taking place within a resource, the profitability of each transaction within a resource, information required to run an application, information input by a customer, information required for a user or a system to make a business decision, or other kinds of information. A resource could also include automatic and manual tasks that represent a business process. For example, an online ordering business system might have a "submit order" task, "check credit" task, and an "obtain shipping information" task. These tasks can be some of the tasks used in generating a business process that can be represented as a business system and managed by the system manager.

To manage business system 402, system manager 400 is programmed to identify the base resource, such as resource A 406. However, a user may select or predetermine the initial resource. To automatically identify a resource, system manager 400 may use a naming convention or may seek out identifying characteristics of a particular kind of resource. For example, system manager 400 may seek out identifying characteristics of a printer and identify the resource as a printer. System manager 400 may also rely on resource database 404 to identify resources if the resources have been previously identified and stored on resource database 404. In an illustrative embodiment, identification of resources is performed by one or more systems management applications that look for certain kinds of resources. The systems management applications identify a resource and make it known in a resource database. The systems management applications could be system manager 400, or could be another system that knows about resources but does not put resources together into business systems. In the latter case, system manager 400 is capable of creating the business system once the database of known resources has been assembled.

The identification of a resource is generally based on the type of the resource. For example, if the resource is a network resource, the IP address is normally part of the resource identification and the subnet may also be included. If the resource is a web application server, identification of the resource may include the cell, the node, and the application server name (such as <cell>/<node>/<appserver>). In an illustrative embodiment, the same type of resources are identified or named with the same convention across systems management applications. Using the same identification or name of a resource across systems management applications aids in resolving duplicate resources. Thus, system manager 400 avoids having two differently named resources that represent the same resource in the database.

In either case, system manager 400 then automatically identifies additional resources and determines the relationships among those resources within business system 402. Thus, the system manager is capable of automatically creating business systems, such as business system 402. In addition, a user may define additional resources to be within business system 402 and may define the relationships among the additional resources and the other resources in business system 402. System manager 400 uses the total information available to create and maintain business system 402.

Turning again to FIG. 4A, in an illustrative embodiment system manager 400 automatically identifies all resources shown within business system 402. Resource A 406 runs on resource C 408 and depends on resource B 410. In turn, resource C 408 is installed on resource E 412, uses resource D 414, and trusts resource F 416. Resource D 414 depends on resource G 418. In an illustrative embodiment, a first resource depends on second resource if the first resource cannot operate without the second resource. A first resource runs on a second resource if the first resource is an application, the second resource is a data processing system, and application runs on the data processing system. A first resource uses a second resource if the first resource uses the second resource but does not require the second resource for operation. A first resource trusts a second resource if the second resource is trustworthy, and the second resource is not necessary for operation of the second resource. In the illustrative embodiment, system manager 400 need not automatically include a trusted resource within business system 402.

The terms "depends on," "uses," "trusts," "runs on," and "installed on" may have different meanings. For example, the term "depends on" could mean that an application depends on a printer to print out checks; however, if the printer is down, the application can still run and print out the checks later. In this case, the application might continue to run without the printer. In general, relationship terms can be construed to mean different types of relationships, depending on how a relationship is defined by system manager 400.

In the illustrative embodiment, system manager 400 automatically identifies each resource within business system 402 and determines the specified relationships among the resources. As resources change states, this information can be used to determine the impact the change has on business system 402. For example, if any of resource B 410, resource C 408, resource D 414, resource E 412, or resource G 418 became unavailable, then resource A 406 would be affected, as would the overall business system 402. If resource B 410 became unavailable, then resource A 406 could not function. The overall impact to business system 402 would be potentially serious, so system manager 400 would treat the failure of resource B 410 as an event for which attention would be a high priority. If possible, system manager 400 would automatically attempt to correct the failure of resource B 410, though system manger 400 could alert a user to the failure of resource B 410 so that the user could take appropriate action.

On the other hand, if resource F 416 failed, then the impact on business system 402 would be minimal or non-existent because resource F 416 is merely a trusted resource. System manager 400 would address the failure of resource F 416, though would assign a lower priority to restoring resource F 416 if system manager 400 also had higher priority tasks. Similarly, system manger 400 could alert a user that resource F 416 had failed so that the user could take appropriate action. Thus, system manager 400 is capable of understanding the priority a given resource has in relation to another resource. System manager 400 is also capable of addressing problems that arise in business system 402 according to the relative priority of each resource and taking appropriate action to correct or work around problems.

In the illustrative embodiment, a user specifies the relative priority of each resource within business system 402 in view of the overall business environment, such as overall business performance or capabilities. For example, a user assigns a numerical rank, such as one to one hundred, to each resource. A rank one hundred resource in the illustrative embodiment is critical to business system 400. A rank one resource in the illustrative embodiment is not necessary to business system 400. Thus, in the illustrative embodiment, a user may specify that resource E 408 and resource C 408 are each rank one hundred because each resource is critical to operating all aspects of business system 402. Resource A 406 may be assigned a rank of seventy-five because it is important, but not critical. Similarly, resource F 416 may be assigned a rank of one because it is not critical to business system 406.

Although resource priority is important, system manager 400 can also automatically determine and address overall business system priorities. Thus, in an illustrative embodiment, system manager 400 determines what resource requires attention first when multiple resources fail. System manager 400 intelligently address problems based on the impact a particular problem has on overall business services and not just on resource priority. Thus, a user determines which business services is most important to be fixed first or the user may define rules that instruct system manager 400 to automatically address certain problems first. Thus, if multiple business services are impacted by one or more problems, the user decides to address problems having the higher overall impact first.

The overall priority of a business service can be determined using different methods. One method would be that an administrator has specified a static value on a business service such that any impact to the business service (any impact to any of its resources) would have a fixed priority value. Another method is to determine automatically the priority value of a resource using calculations based on the actual resources impacted. These calculations could take into account different a number of factors, such as the priority of the impacted resources or how far away the resources are from the root of the impacted business system. Other methods include any other algorithm that uses data in the environment to determine business system impact value. Thus, system manager 400 is capable of automatically and intelligently addressing problems within one or more business systems according to the overall impact a particular problem has on the overall business enterprise.

System manager 400 may also automatically define the relative priority of resources. In this case, system manager 400 is provided with or creates a set of rules that govern the relative importance of a given resource. For example, system manger 400 may be provided with rules that specify that a transaction server has a higher priority than a web server, and that any kind of server has a higher priority than a printer. In another example, system manager 400 may be provided with rules that rely on a naming convention to automatically assign a relative priority to a given resource. Thus, system manager 400 may be provided with rules that cause it to seek out and identify all resources named "computer" and assign a relative priority to each "computer" based on the rules. Similarly, rules may be provided such that system manager 400 is capable of identifying various types of named resources. Continuing the example, system manager 400 may identify all resources named "computer" and further identify and prioritize these resources based on other factors, such as processor speed, geographical location, or any other factor. In any case, as system manger 400 automatically identifies the resources of a business system, system manager is also capable of automatically assigning the relative priority of each resource as well as automatically specifying the relationships among the resources within the business system.

System manager 400 may use the rank or priority of each resource to automatically create and/or maintain business system 402. System manager 400 or a user can create the relationships among all resources within business system 402. System manager 400 then uses the relationships among resources and/or the relative priority of each resource to automatically maintain business system 402. In addition, system manager 400 may use user-defined rules or rules created by system manager 400 to maintain business system 402. For example, rules can be written to automatically create and/or delete business systems and relationships as transactions occur within business system 402. As the resources and/or relationships used in support of the transactions change, system manager 400 can automatically update business system 402.

Figure 4B:
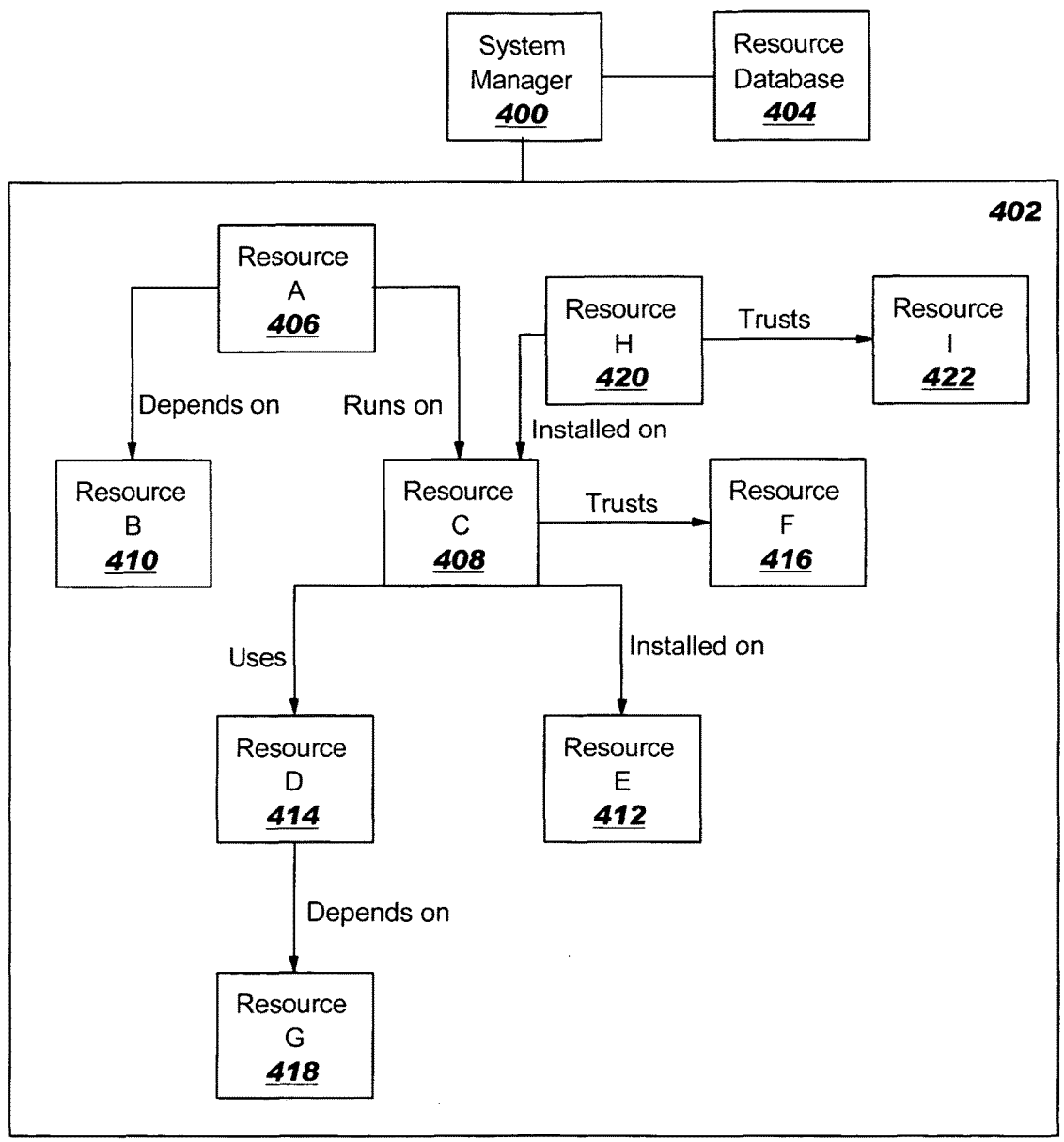
FIG. 4B is a block diagram illustrating a modified set of resource dependencies for a business system, in accordance with a preferred embodiment of the present invention.

FIG. 4B is a block diagram illustrating a modified set of resource dependencies for a business system 402, in accordance with a preferred embodiment of the present invention. In the illustrative embodiment shown in FIG. 4B, business system 402 has been modified by system manager 400. The relative relationships among resource A 406, resource B 410, resource C 408, resource D 414, resource E 412, resource F 416, and resource G 418 have not changed. Due to changing business conditions, resource H 420 and resource I 422 have been added to business system 402.

System manager 400 automatically identifies the addition of resource H 420 and resource I 422. System manager 400 also receives user input regarding the priority of each resource, if not automatically determined. System manager 400 then automatically updates business system 402 to include those two resources and their relationship within business system 402. System manager 400 may also accept user input regarding the relationship of resource H 420 and resource I 422 and maintain business system 402 accordingly. In the illustrative embodiment, resource H 420 is installed on resource C 408 and trusts resource I 422.

Figure 4C:
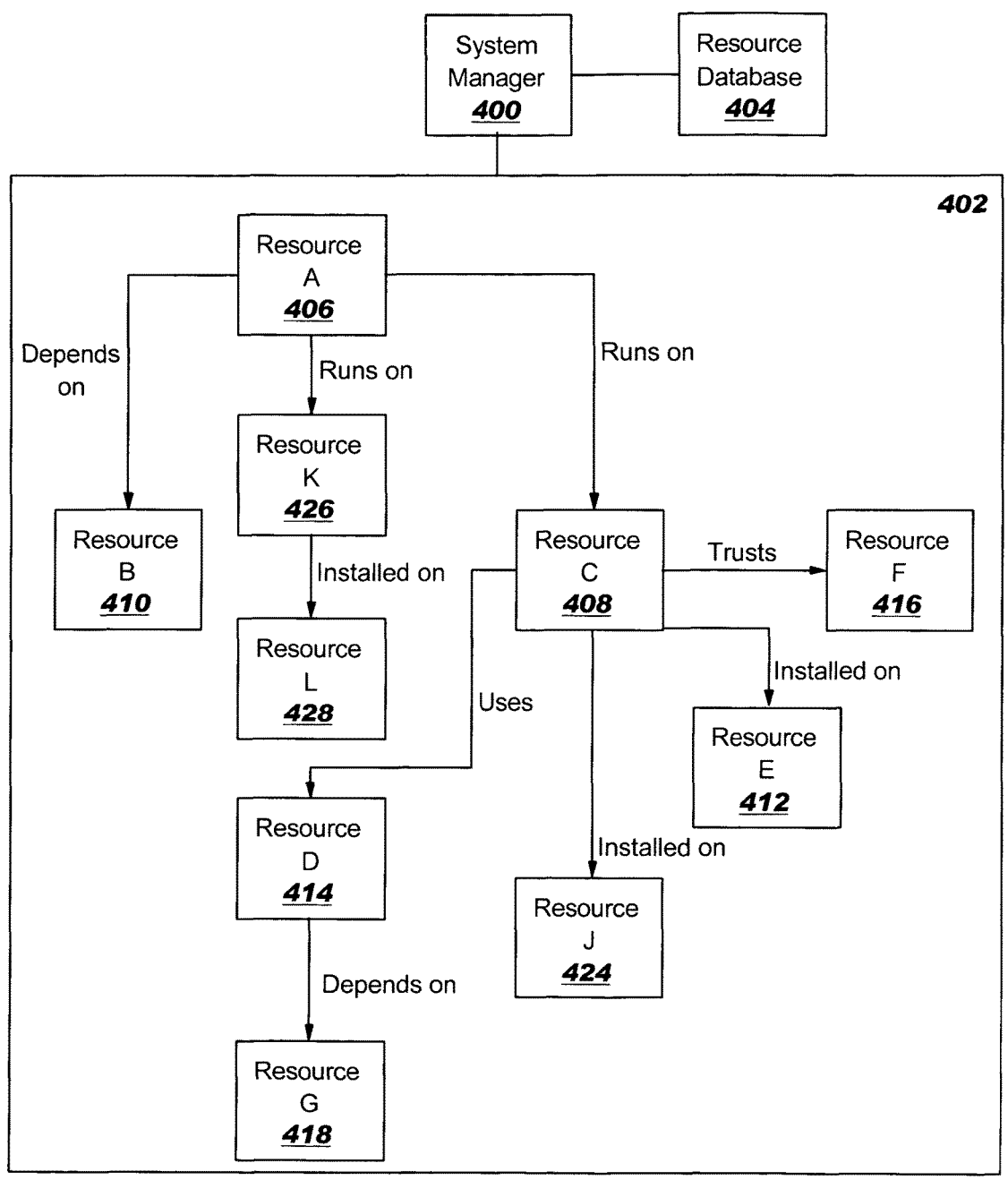
FIG. 4C is a block diagram illustrating a modified set of resource dependencies for a business system, in accordance with a preferred embodiment of the present invention.

FIG. 4C is a block diagram illustrating a modified set of resource dependencies for a business system, in accordance with a preferred embodiment of the present invention. In the illustrative embodiment of FIG. 4C, system manager 400 has adjusted business system 402 shown in FIG. 4B according to a change in the business environment. In this case, system manager 400 has automatically deleted resource H 420 and resource I 422 shown in FIG. 4B because system manager 400 detected that resource H 420 had failed. Because resource C 408 has a high priority rank, system manager 400 automatically finds another resource, resource J 424, and installs resource C 408 on resource J 424 in order to increase the reliability of business system 402.

In addition, a user increased the priority rank of resource A. System manager 400 uses that information to determine that resource A requires another backup system to further increase the reliability of resource A. Therefore, system manager 400 identifies resource K 426 and resource L 428 and specifies that resource A 406 runs on resource K 426, which is installed on resource L 428.

Accordingly, system manager 400 automatically adjusted business system 402 according to a change in the business environment. In this case, the change in business environment varied for two reasons. The first reason is that resource C 408 required additional stability due to the failure of resource H 420. System manager 400 automatically detected this event and maintained business system 402 accordingly. The second reason is that a user manually increased the priority rank of resource A. Again, system manager 400 automatically adjusted business system 402 accordingly.

In the preceding example, system manager 400 makes modifications to the system environment itself. In other words, resources are physically added or removed in business system 402. In addition, system manager 400 can modify relationships among the resources without adding or deleting resources. For example, the business system may contain a transaction resource for which the resources used in the transaction change over time. Business systems that contain this transaction need to be updated. In this case, if the resource fails it may not be necessary to try to fix the problem; however, understanding the impact of the failure on the business system allows the system manager to change relationships among the resources.

In another example, turning again to FIG. 4C, if resource G 418 fails then resource D 414 fails. Although resource C 408 continues to function, system manager 400 may determine, based on a variety of factors determined automatically or by the user, that resource F 416 is no longer merely trusted, but "used." In this case, system manager 400 automatically adjusts the dependency of resource F 416 on resource C 408 from "trusted" to "uses." Similarly, system manager could change the resource dependency of resource F 416 from "trusts" to "depends on." At the same time, due to the overall impact on business system 402 of the failure of resource G 418, system manager 400 also increases the relative priority of resource A 406. System manager 400 is thus capable of adjusting relationships as well as the physical dependencies of business system 402.

Figure 5:
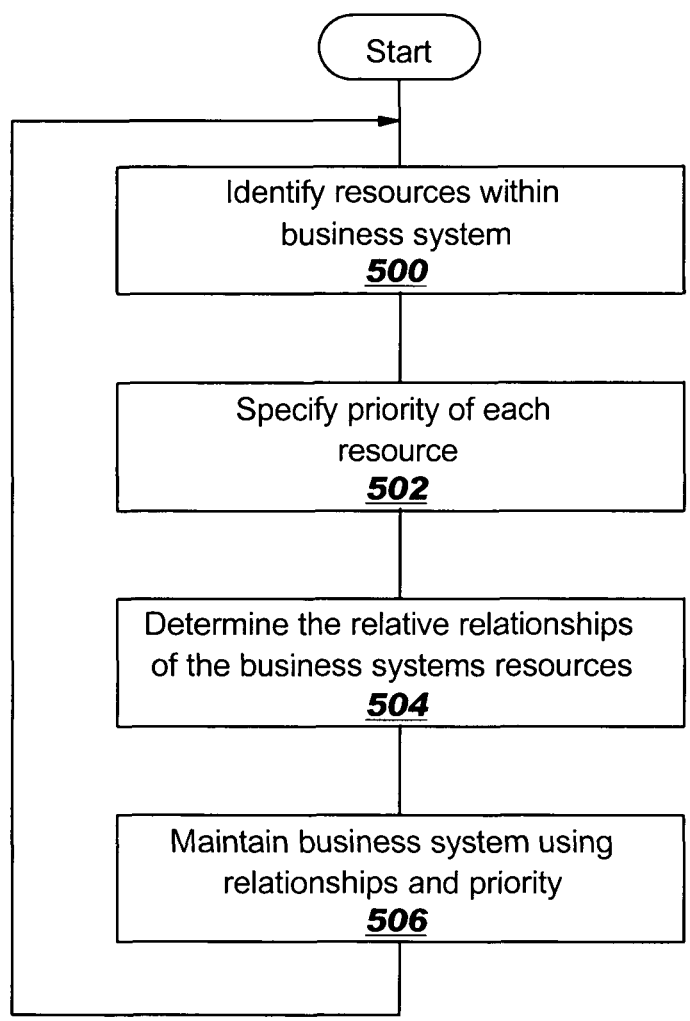
FIG. 5 is a flowchart showing the process a system manager may use to maintain a business system, in accordance with a preferred embodiment of the present invention.

FIG. 5 is a flowchart showing the process a system manager may use to maintain a business system, in accordance with a preferred embodiment of the present invention. First, the system manager automatically identifies all resources to be included within the business system (step 500). During this step, the system manager or a user may exclude certain resources from the business system or may specify that a particular resource should be assigned to a different business system. (The system manager may maintain more than one business system.) The system manager automatically identifies resources based on one or more conventions, such as name, pre-determined rank, geographical location, resource type, or other conventions. The identity of each resource is provided to a resource database for storing information regarding each resource. The system manager can then access the information in the resource database while maintaining the business system.

Next, the relative priority of each resource within the business system is specified (step 502). In an illustrative embodiment, a user specifies the priority rank of each resource. In this case, the priority rank is a numerical value assigned to each resource, with the numerical value indicative of the relative importance of a resource to the business system or to the overall business. For example, the priority rank may be a number between one and one hundred. In another illustrative embodiment, the system manager may automatically assign the relative priority of each resource based on predetermined rules, naming conventions, or other convention. The relative priority of each resource is provided to a resource database for storing information regarding relative priority. The system manager can then access the information in the resource database while maintaining the business system.

Subsequently, the system manager automatically identifies or determines the relative relationships of the resources within the business system (step 504). Again, the determination of these relationships could be done by any system that understands them. Once the determination is made, the resources and relationships are updated in the database. Thus, the system manager can specify that one resource depends on another resource, is installed on another resource, trusts another resource, uses another resource, or has some other relationship with another resource within the business system. A resource may also have a relationship with an additional business system that the system manager maintains. In addition, a user may optionally determine the relative relationship of resources within the business system or may create rules that govern how the system manager maintains the resources. The relationship of each resource is provided to a resource database for storing information regarding the relationships of resources within the business system. The system manager can then access the information in the resource database while maintaining the business system.

Next, the system manager maintains the business system using the relationships among resources and/or the priority rank of each resource (step 506). Thereafter, the system manager returns to step 500 and continues the process of maintaining the business system. While maintaining a business system, the system manager may add a resource to the business system, delete a resource from the business system, adjust the dependency of one resource relative to another resource, otherwise adjust the relationship of a resource relative to another resource, causing an application to take a particular action, adjusting the operating process of a data processing system in any necessary manner, or otherwise adjusting or maintaining the business system.

Figure 6:
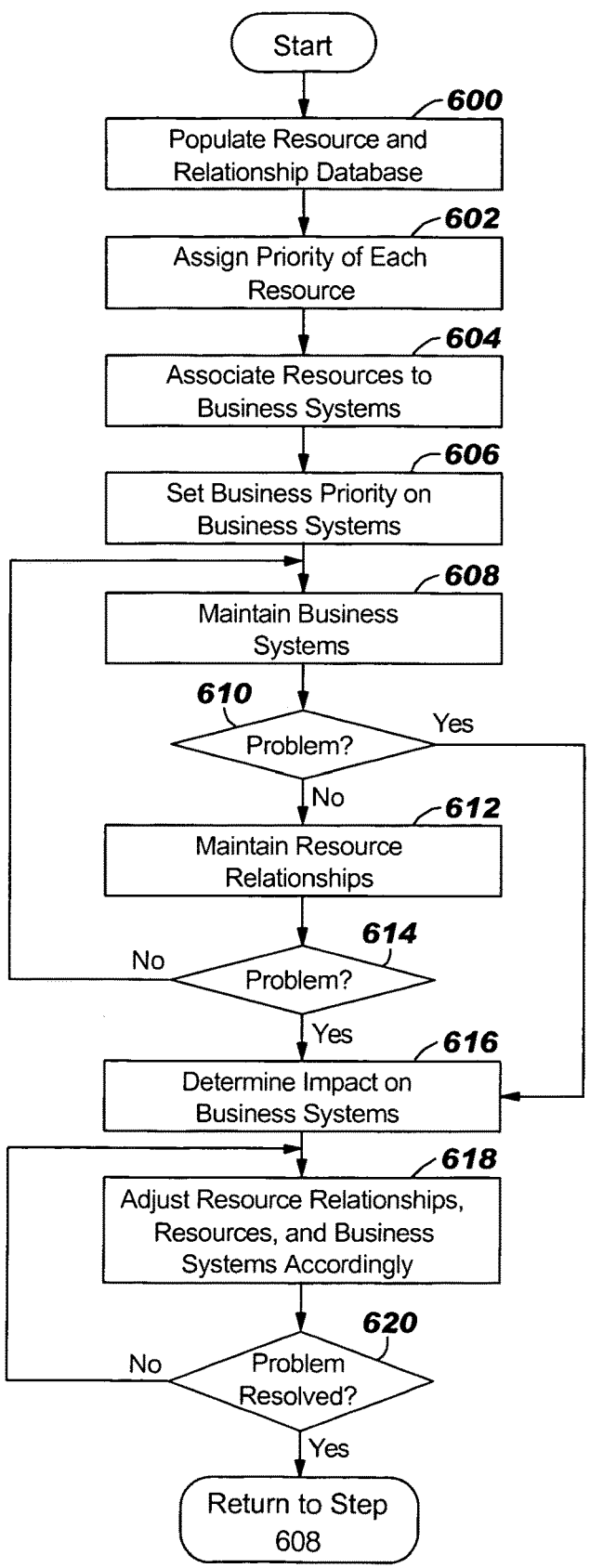
FIG. 6 is a flowchart showing the process a system manager may use to maintain a business system, in accordance with a preferred embodiment of the present invention.

FIG. 6 is a flowchart showing the process a system manager may use to maintain a business system, in accordance with a preferred embodiment of the present invention. First, the relationship database is populated with all available resources and the known relationships among the resources (step 600). This step allows for assignment of a single resource to a business system. Assigning a resource to a business system will bring along all of the other resources identified with that resource, all the way down to the lowest level. For example, referring again to FIG. 4A, if resource A 406 is placed in a business system, resource B 410 through resource G 418 are also incorporated without having to specifically identify them.

While the relationships among resources can be specified by an administrator, the relationships among those resources can also be determined by an external application. For example, an application can determine that resource A 406 (a Web Application Server) runs on resource B 410 (a data processing system named name.area.company.com), depends on resource C 408 (a database server named name.area.company.com), and so on. With the external application having defined those resources and relationships, system manager 400 only has to add resource A 406 to business system 402 and all of the other resources and relationships are automatically brought into the business system.

After populating the resource and relationships database, the priority of each resource is set (step 602). The priority can be set manually by the administrator or automatically by the system manager. The set priority for a resource is the global default resource priority for that resource. The global default resource priority can be overridden as a resource is added to a business system.

After assigning resource priorities, resources are associated with one or more business systems (step 604). One resource may be associated with a single business system, or a resource may be associated with more than one business system. Thus, using the example shown in FIG. 4A, resource A 406 may belong to business system 402 and also to another business system. The process of associating resources with business systems may be performed manually by a user. The process may also be performed automatically based on rules or conventions, as described above. The process may also be a combination of the two procedures, such as where a user specifies a single resource to be within one or more business systems and the system manager automatically brings all of the associated resources with that resource into each corresponding business system.

After resources have been associated with all business systems, the business priority on all business systems is set (step 606). The business priority represents the importance a business system has on the overall business enterprise. Thus, one or more system managers can manage one or more business systems, each containing one or more resources. In an illustrative example, the system manager automatically determines the priority of a business system based on rules defined by the user or the manufacturer of the system manager. In another illustrative example, a user can set the business priority manually.

Next, the system manager or system managers maintain the business system or business systems (step 608). The system manager or system managers perform the step of maintaining by changing or adapting relative resource priority within the business systems or by keeping resource priority static as a default. The system manager or system managers may also create or adjust relationships among distinct business systems.

The system manager or system managers monitor the business system or business systems for problems (step 610). If a problem arises, then the system manager or system managers determine the impact the problem has on the business system or business systems, as described with regard to step 616 below. If no problems exist, then the system manager or system managers continue to maintain the business system or business systems by maintaining resource relationships within each business system (step 612) and/or by maintaining relationships among business systems.

As the resource relationships are maintained in step 612, a business system definition will be automatically updated as the resources within a business system are automatically updated. For example, when the resources associated with a transaction change, such as when a transaction flows through another servlet, the system manager updates the resources and relationships associated with the transaction in the database. Each of the business systems that include that transaction are automatically updated to reflect this change.

Next, the system manager or system managers monitor the business system or business systems for whether a problem arises while maintaining resource relationships (step 614). If no problem arises, then the system manager or system managers continue to maintain the business systems and resource relationships, returning to step 608.

If a problem does arise, then the system manager or system managers determine the impact value the problem has on the business systems (step 616). The impact value of the business system can be calculated based on any number of algorithms, such as those described with respect to FIG. 4A through FIG. 4C. The impact value may have a numerical value, such as between one (minimal impact) and one hundred (very high impact), or any other numerical scheme.

Based on the relative impact value, the system manager or system managers adjust the resource relationships, resources, and/or business systems accordingly (step 618).

For example, a system manager may adjust resource relationships and resource dependencies as shown with respect to FIG. 4A through FIG. 4C to resolve problems within the business system. In addition, the system manager or system managers may adjust the relationships and dependencies among resources in one business system in response to problems or events occurring in one or more other business systems. Similarly, the system manager or system managers may adjust the relationships among multiple business systems. Thus, the business environment can be updated automatically to resolve the problem within the business system or business systems.

After adjusting resource relationships, resource dependencies, and/or other business systems, the system manager or system managers determine whether the problem has been resolved (step 620). If the problem has not been resolved, or if additional problems arise, then the process returns to step 618, whereupon the system manager or system managers continue to make adjustments in an attempt to resolve the problem or problems. If necessary, the system manager or system managers may prompt a user for input. For example, if the system manager or system managers determine that user input would most efficiently solve the problem or problems, then the system manager or system managers will prompt a user accordingly. Similarly, if the system manager or system managers are unable to resolve the problems, then the user may be prompted accordingly.

Once the problem is resolved, the process returns to 608, whereupon the system manager or system managers continue to maintain the business system or business systems. The process continually iterates through steps 608 and 620, such that the business system or business systems may be maintained indefinitely.

Thus, the present invention provides for automatically and intelligently maintaining business systems. The present invention provides an advantage over prior art methods of maintaining business systems in that the system manager can automatically create and adjust resource dependencies and relationships based on named relationships and a numerical priority rank. Thus, a business can reduce the expense of maintaining a business system by reducing the amount of skilled labor and equipment required to maintain a business system.

The inventions described herein intelligently maintain business systems. In addition, the inventions described herein may be adapted to control any enterprise or collection of information technology resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of maintaining the operation of computer networked resources, the method comprising:
   at a computer network system manager resident in a computer with a processor, identifying a plurality of three or more computer networked resources as a set, the plurality of network resources in the set being separated apart from each other over the network and the plurality of network resources in the set independently reachable via the network without communication through the system manager,
   at the network system manager, after identification of the plurality of network resources in the set, assigning a relative resource priority rank to each resource identified within the set of networked resources;
   after identification of each resource within the set of networked resources, the network system manager updating a resource database to associate each resource within the set of networked resources to at least one defined data processing system;
   assigning a priority to each defined data processing system associated with a network resource, the priority relative to other defined data processing systems;
   for each defined data processing system, creating at least one operational relationship for each networked resource within the defined system to at least one other networked resource within the defined system; and
   at the system manager, maintaining operational relationships among the networked resources of at least one defined system using the relative priority rank of each networked resource,
      wherein maintaining operational relationships includes adjusting operational relationships among the networked resources used by the system manager to maintain operation of the networked resources after determining that an identified network problem has not been resolved.

2. The method of claim 1 wherein
   the network includes a printer as a resource and a server as a resource;
   each networked resource in the set is apart from the system manager over the network;
   each networked resource in the set is apart from the other resources in the set and is reachable over the network by other resources in the set; and
   identifying resources includes using a network ip address to identify the resource; and
   maintaining relationships further comprises adjusting the relationships among networked resources.

3. The method of claim 1 further comprising:
   receiving instructions from a user to add an additional network resource to the set of networked resources; and
   at the system manager, monitoring state of the resources in the data processing system and determining the change in state of the specific resource has on the data processing system.

4. The method of claim 3 wherein:
   adding an additional resource changes a relationship among at least two resources within the set of networked resources, and
   assigning a relative resource priority rank to each resource identified within the set of networked resources is automatically carried out by the system manager using a set of rules that govern the relative importance of a resource.

5. The method of claim 1 wherein TCP/IP is used to communicate over the network and wherein the operational relationships comprises dependencies on another resource in the set, trust of another resource in the set, and running on another resource in the set.

6. The method of claim 1 wherein maintaining operational relationships are performed by the system manager in response to the system manager determining an impact value of a problem that arises within at least one defined system.

7. The method of claim 1 wherein the set of resources is further maintained using a predetermined rule created by a user.

8. The method of claim 1 wherein maintaining operational relationships includes removing at least one resource from the set of networked resources as transactions occur within one defined data processing system.

9. The method of claim 1 wherein maintaining operational relationships includes changing the relationships of how resources depend from each other, avoiding duplicative entries in a database by using the same identification of a network resource across different systems management applications, and adjusting resource operational relationships among the networked resources for the system manager to manage the networked resources, after determining that a network problem has not been resolved.

10. The method of claim 1 further comprising:
    receiving resource priority rankings from a user over the network.

11. The method of claim 1 further comprising:
    upon a change in a resource or an association among resources, updating the defined system wherein the updating comprises deleting a resource or installing a resource.

12. The method of claim 1 wherein assigning a relative resource priority rank to each resource identified within the set of networked resources comprises using a global default resource priority.

13. The method of claim 1 wherein associating each identified resource within the set of networked resources to at least one defined networked system from a plurality of defined networked systems; and
    at the system manager, maintaining relationships among the networked resources of one system of the plurality of defined network systems based on problems occurring in another defined network system.

14. A data processing system for managing operation of networked resources, the system comprising:
    a bus;
    a memory operably connected to the bus;
    a processor unit operably connected to the bus;
    a computer program product in the memory for managing a business system, the computer program product comprising:
    first instructions for assigning a relative priority among resources to each resource within a defined set of networked resources, two or more of the networked resources apart from one another over the network and in communication with other networked resources in the set over the network without their communication necessarily passing through the system manager;

second instructions for associating each resource within the defined set of networked resources to the business system;

third instructions for creating at least one dependency relationship for each networked resource within the business system to at least one other networked resource within the business system; and fourth instructions maintaining operational dependency relationships of two or more networked resources in the defined set of network resources by detecting dependency relationship problems of two or more networked resources in the business system and by making adjustments to the operational dependency of the two or more networked resources in the defined set of network resources, the dependency adjustments between networked resources to resolve a detected problem of a resource within the defined set of networked resources in the business system.

15. A method of maintaining operation of a business system, the business system comprising a set of networked resources, the method comprising:

at a system manager resident in a computer with a processor, the system manager in communication over a network with a first resource remote from the system manger and reachable over the network without communication necessarily made through the system manager and a second resource remote from the system manager and reachable over the network without communication necessarily made through the system manager, at the system manager, maintaining an operational relationship between the first resource and the second resource, at the system manager, associating the first resource and the second resource to a first business system of networked resources and, assigning a relative resource priority ranking to the first resource and the second resource;

storing in a database, the operational relationship maintained by the system manager between the first resource and the second resource; and at the system manager, maintaining operation of the business system, using the operational relationship stored in the database, by modifying at least either the priority of the first resource or the priority of the second resource or an association between the first resource and the second resource for subsequent use by the system manager for operation of the business system.

16. The method of claim 15 further comprising:

receiving user input of resource priority at the system manager and assigning an updated priority to one or more resources, updating associations between the first resource and the second resource after a change in state of at least one resource to maintain operation of the business system by the system manager, wherein the relationship specified by the system manager is a dependency relationship, and, wherein the first resource and the second resource were previously unassociated to a business system before being associated to the first business system of networked resources.

17. The method of claim 15 wherein prior to modifying either the priority of a resource or an association between resources, considering one or more rules that govern the relative importance of a specific resource, the one or more rules comprising identification of the type of resource or the name of the resource or the geographical location of the resource or the processor speed of the resource.

18. The method of claim 15 further comprising:

adding an additional resource to the first business system of networked resources; and after adding an additional resource, adjusting one or more relationships among resources within the first business system.

19. The method of claim 15 wherein:

the system manager executes instructions to identify the category of a resource and to assign a resource priority based on the category of the resource, the resource priority including a numeric value and wherein the network employs TCP/IP for exchanges between the first resource and the second resource and the system manager.

20. The method of claim 19 wherein:

the resource priority is based on a type of resource and further qualified based on a second factor, and the system manager also executes instructions that provide that each resource identified to be in the same category is assigned the same priority as every other resource having that category designation.

21. The method of claim 15 wherein the first resource consists of one of the following: a network printer, a network database or a network server.

22. The method of claim 15 wherein the priority of a resource or the association between resources is modified using an impact value of a problem and wherein the network is a wide area network or the Internet.

23. The method of claim 15 further comprising:

adjusting an association between resources to add additional stability do to failure of a resource;

receiving manual input from a user that increases a priority rank of a resource; and removing a resource from the first business system of networked resources.

24. The method of claim 15 further comprising:

evaluating overall business system priorities when multiple resources across the first business system and a second business system fail;

identifying each resource from the first business system of networked resources and storing in the database, a relationship between each identified resource in the first business system, the resources including a network printer.

* * * * *